Patented July 5, 1927.

1,634,925

UNITED STATES PATENT OFFICE.

GEORGE STAFFORD WHITBY, OF MONTREAL, QUEBEC, CANADA, ASSIGNOR TO THE ROESSLER & HASSLACHER CHEMICAL CO., OF NEW YORK, N. Y., A CORPORATION OF NEW YORK.

ACCELERATOR FOR THE VULCANIZATION OF RUBBER.

No Drawing. Application filed January 27, 1926. Serial No. 84,154.

The object of this invention is to provide a new and improved class of accelerators for the vulcanization of rubber which will give to the finished rubber product excellent physical properties such as desirable stress strain relationship, high tensile strength, rapidity of vulcanization and related properties.

This invention relates to the use of compounds which are formed by the reaction of salts of dithiocarbamic acids with sulphur chlorides. These reaction products are new in the art; the preparation of these is disclosed in a copending application, S. N. 84,153, filed by me of even date herewith and the new compositions of matter are claimed therein.

I have found that if these compounds are used as accelerators in the vulcanization of rubber very superior results are obtained as shown in the examples given below.

As shown in my copending application, S. N. 84,153, the compounds are formed from dithiocarbamates of the general formula:

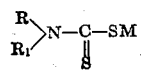

wherein R may be hydrogen or any organic radical while $R_1$ is hydrogen or an organic radical similar or dissimilar to R; M may be any metallic element or equivalent group such as zinc, potassium, sodium, ammonium, etc. These dithiocarbamates are treated with a sulphur chloride of the general formula $S_xCl_2$ and a reaction takes place between two moles of the dithiocarbamate and one of the sulphur chloride to form a new compound. I believe this reaction to be substantially as follows:

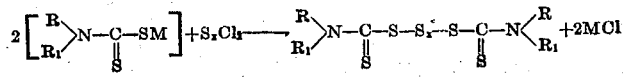

Thus, for example, if sulphur monochloride is used the general reaction becomes:

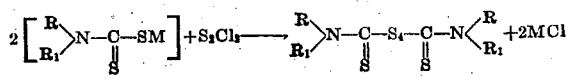

whereas if sulphur dichloride is used a trisulphide form results viz:

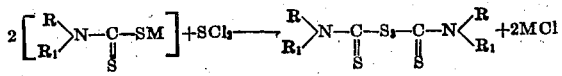

The chloride of the metal M is always formed in the reaction. The arrangement of the central sulphur atoms represented as $S_x$, $S_4$ or $S_3$ is unknown to me. These products are simply named as substituted thiuram polysulphides, such as, tetra substituted thiuram tetra sulphide or trisulphide.

I have prepared and used as accelerators of vulcanization new materials prepared from sulphur monochloride and sulphur dichloride with various salts of dimethyl-, diethyl-, dibutyl-, dipropyl-, "piperidyl"-, phenyl methyl-, and phenyl ethyl- dithiocarbamic acid. I have used zinc, potassium, sodium and ammonium salts of these in various combinations.

The thiuram polysulphides thus formed may be used as the accelerator in any common rubber compound which utilizes as a basic mixture the ingredients rubber or similar material and sulphur; this basic mixture may be utilized in a great variety of compounds, such as those for example utilizing new or reclaimed rubber, rubber substitutes, zinc oxide, carbon black and other coloring matter and fillers. I have also found that my accelerator can be utilized in various compounded rubber mixtures as noted above and also if desired without the addition of sulphur other than that carried by my polysulphide accelerator.

EXAMPLE I.

*Di-piperidyl thiuram tetrasulphide.*

100 parts by weight of smoked sheet, 5 parts by weight of zinc oxide, 5 parts by weight of sulphur, 0.5 parts by weight of product above named.

This mixture was properly milled and then cured at a temperature corresponding to that of steam at 10 lbs./in² pressure. The following results were obtained:—

| Time of cure. | Stretch. | Load at 600% elong. | Tensile strength. |
|---|---|---|---|
| 25 minutes. | 8.3 | | 5266 lbs/in² |
| 30 minutes. | 8.16 | | 5840 lbs/in² |
| 45 minutes. | 7.91 | 3200 lbs./in² | 5233 lbs/in² |
| 60 minutes. | 7.8 | 2700 lbs./in² | 4846 lbs/in² |

Example II.

*Di-phenylethyl thiuram tetrasulphide.*

100 parts by weight smoked sheet, 5 parts by weight zinc oxide, 5 parts by weight sulphur, 0.5 part by weight of above named compound.

This mixture was suitably milled and then cured at a temperature corresponding to that of steam at 10 lbs./in² pressure. The results were:

| Time of cure. | Stretch. | Load at 600% elong. | Tensile strength. |
|---|---|---|---|
| 30 minutes. | 8.5 | 2600 lbs./in² | 4581 lbs./in² |
| 40 minutes. | 8.91 | 2500 lbs./in² | 4903 lbs./in² |
| 50 minutes. | 8.6 | 2000 lbs./in² | 3990 lbs./in² |

Example III.

*Di-phenylethyl thiuram tetrasulphide.*

100 parts by weight smoked sheet, 5 parts by weight zinc oxide, 4 parts by weight of above named compound.

Cured at temperature corresponding to that of steam at 10 lbs./in² pressure.

| Time of cure. | Stretch. | Tensile strength. |
|---|---|---|
| 45 minutes | 7.9 | 3059 lbs./in² |
| 60 minutes | 8.0 | 3704 lbs./in² |

Example IV.

*Di-phenylethyl thiuram tetrasulphide accelerator.*

100 parts by weight smoked sheet, 25 parts by weight carbon black, 15 parts by weight zinc oxide, 5 parts by weight sulphur, 0.5 part by weight of above named compound. Cured at a temperature corresponding to that of steam at 10 lbs./in² pressure.

| Time of cure. | Stretch. | Load at 600% elong. | Tensile strength. |
|---|---|---|---|
| 45 minutes. | 8.1 | 2800 lbs./in² | 3198 lbs./in² |
| 60 minutes. | 8.1 | 2700 lbs./in² | 3682 lbs./in² |
| 75 minutes. | 7.6 | 3000 lbs./in² | 3242 lbs./in² |

Example V.

*Tetraethyl thiuram tetrasulphide accelerator.*

100 parts by weight smoked sheet, 5 parts by weight zinc oxide, 5 parts by weight sulphur, 0.5 parts by weight accelerator. Cured at temperature corresponding to 10 pounds steam.

| Time of cure. | Stretch. | Load at 600% elong. | Tensile strength. |
|---|---|---|---|
| 20 minutes. | 9.5 | 1200 lbs./in² | 4474 lbs./in² |
| 30 minutes. | 9.12 | 1800 lbs./in² | 5490 lbs./in² |
| 40 minutes. | 8.7 | 2675 lbs./in² | 5155 lbs./in² |

Example VI.

*Di-phenylethyl thiuram trisulphide.*

0.5 parts by weight of this were used as accelerator in the formula of example V. Cured at a temperature of 10 pounds steam.

| Time of cure. | Stretch. | Load at 600% elong. | Tensile strength. |
|---|---|---|---|
| 30 minutes. | 8.12 | 2800 lbs./in² | 4460 lbs./in² |
| 40 minutes. | 8.8 | 2200 lbs./in² | 4454 lbs./in² |

Example VII.

*Tetra-methyl thiuram trisulphide.*

0.5 parts by weight of this were used as the accelerator in the formula of example V. Cured at temperature of 10 pound steam.

| Time of cure. | Stretch. | Load at 600% elong. | Tensile strength. |
|---|---|---|---|
| 30 minutes. | 9.0 | 1700 lbs./in² | 4361 lbs./in² |
| 40 minutes. | 8.5 | 2200 lbs./in² | 4513 lbs./in² |
| 50 minutes. | 8.0 | 3300 lbs./in² | 4468 lbs./in² |

Example VIII.

*Tetra-butyl thiuram tetrasulphide.*

0.5 parts by weight of this were used as the accelerator in the formula of Example V. Cured at temperature of 10 lbs. steam.

| Time of cure. | Stretch. | Load at 600% elong. | Tensile strength. |
|---|---|---|---|
| 30 minutes. | 9.5 | 900 lbs./in² | 3658 lbs./in² |
| 40 minutes. | 9.0 | 1500 lbs./in² | 4393 lbs./in² |
| 50 minutes. | 8.5 | 2600 lbs./in² | 4361 lbs./in² |
| 60 minutes. | 8.12 | 2500 lbs./in² | 4035 lbs./in² |

Example IX.

*Tetra-methyl thiuram tetrasulphide accelerator.*

100 parts by weight smoked sheet, 5 parts by weight zinc oxide, 5 parts by weight accelerator. Cured at a temperature of 10 pound steam.

| Time of cure. | Stretch. | Load at 600% elong. | Tensile strength. |
|---|---|---|---|
| 15 minutes. | 9.02 | 1450 lbs./in² | 3690 lbs./in² |
| 20 minutes. | 8.6 | 1400 lbs./in² | 3826 lbs./in² |
| 30 minutes. | 8.6 | 1450 lbs./in² | 3749 lbs./in² |

It will be noted that Examples III and IX illustrate an application of my invention wherein no free sulphur is compounded with the rubber; the polysulphide carries with it the requisite sulphur.

The above examples are merely for purposes of illustration of methods of practicing my invention and I do not desire to be limited to the ingredients of the rubber mixtures noted nor to any of the proportions and methods given since my accelerators are capable of wide adaptation in rubber mixes.

What I claim is:

1. A process of treating rubber or similar material which comprises incorporating with the rubber compound a vulcanizing agent and a thiuram polysulphide containing more than four atoms of sulphur per molecule, and vulcanizing.

2. A process of treating rubber or similar material which comprises incorporating with the rubber compound a vulcanizing agent and a substituted thiuram polysulphide containing more than four atoms of sulphur per molecule, and vulcanizing.

3. A process of treating rubber or similar material which comprises incorporating with the rubber compound a vulcanizing agent and a diaryl-dialkyl substituted thiuram polysulphide containing more than four atoms of sulphur per molecule, and vulcanizing.

4. A process of treating rubber or similar material which comprises incorporating with the rubber a tetrasubstituted thiuram polysulphide containing more than four atoms of sulphur per molecule and vulcanizing.

5. A process of treating rubber or similar material which comprises incorporating with the rubber a vulcanizing agent and the reaction product of a substituted dithiocarbamate with a sulphur chloride of the formula $S_xCl_2$, and vulcanizing.

6. A process of treating rubber or similar material which comprises incorporating with the rubber a vulcanizing agent and the reaction product of a disubstituted dithiocarbamate with a sulphur chloride of the formula $S_xCl_2$, and vulcanizing.

7. A process of treating rubber or similar material which comprises incorporating with the rubber a vulcanizing agent and a thiuram polysulphide of the general formula

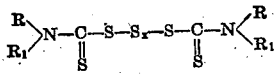

wherein R is hydrogen or an organic radical while $R_1$ is hydrogen or an organic radical similar or dissimilar to R, and vulcanizing.

8. A process of treating rubber or similar material which comprises incorporating with the rubber a vulcanizing agent and a thiuram polysulphide of the general formula

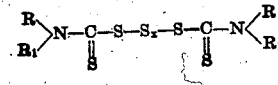

wherein R and $R_1$ are similar or dissimilar organic radicals, and vulcanizing.

9. A process of treating rubber or similar material which comprises incorporating with the rubber a vulcanizing agent and a thiuram polysulphide of the general formula

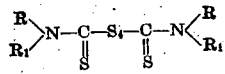

wherein R is hydrogen or an organic radical while $R_1$ is hydrogen or an organic radical similar or dissimilar to R, and vulcanizing.

10. The process of accelerating the vulcanization of rubber comprising vulcanizing the same in the presence of a thiuram polysulfide containing more than four atoms of sulfur per molecule.

11. The process of accelerating the vulcanization of rubber comprising vulcanizing the same in the presence of a diaryl-dialkyl substituted thiuram polysulfide containing more than four atoms of sulfur per molecule.

12. The process of accelerating the vulcanization of rubber comprising vulcanizing the same in the presence of the reaction product of a dithiocarbamate with a sulfur chloride of the formula $S_xCl_2$.

13. The process of accelerating the vulcanization of rubber comprising vulcanizing the same in the presence of the reaction product of a substituted dithiocarbamate with a sulfur chloride of the formula $S_xCl_2$.

14. The process of accelerating the vulcanization of rubber comprising vulcanizing the same in the presence of the reaction product of a disubstituted dithiocarbamate with sulfur monochloride.

15. The process of accelerating the vulcanization of rubber comprising vulcanizing the same in the presence of the reaction product of an aryl-alkyl substituted dithiocarbamate with sulfur monochloride.

16. The process of accelerating the vulcanization of rubber comprising vulcanizing the same in the presence of a thiuram polysulfide of the general formula

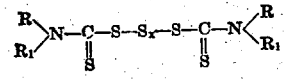

wherein R is hydrogen or an organic radical while $R_1$ is hydrogen or an organic radical similar or dissimilar to R.

17. The process of accelerating the vulcanization of rubber comprising vulcanizing the same in the presence of a thiuram polysulfide of the general formula

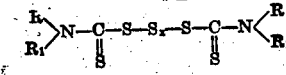

wherein R and $R_1$ are similar or dissimilar organic radicals.

18. The process of accelerating the vulcanization of rubber comprising vulcanizing the same in the presence of a thiuram polysulfide of the general formula

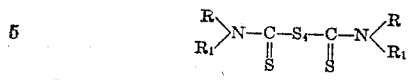

wherein R is hydrogen or an organic radical while $R_1$ is hydrogen or an organic radical similar or dissimilar to R.

19. The process of accelerating the vulcanization of rubber comprising vulcanizing the same in the presence of diphenylethyl thiuram tetrasulfide.

20. A vulcanized rubber derived from rubber or similar material in which is incorporated a vulcanizing agent and a substituted thiuram polysulphide containing more than four atoms of sulphur per molecule.

21. A vulcanized rubber derived from rubber or similar material in which is incorporated a thiuram polysulphide containing more than four atoms of sulphur per molecule.

22. A vulcanized rubber derived from rubber or similar material in which is incorporated tetrasubstituted thiuram polysulphide containing more than four atoms of sulphur per molecule.

23. A vulcanized rubber derived from rubber or similar material in which is incorporated a vulcanizing agent and the reaction product of a dithiocarbamate with a sulphur chloride of the formula $S_xCl_2$.

24. A vulcanized rubber derived from rubber or similar material in which is incorporated a vulcanizing agent and the reaction product of a substituted dithiocarbamate with a sulphur chloride of the formula $S_xCl_2$.

25. A vulcanized rubber derived from rubber or similar material in which is incorporated a vulcanizing agent and the reaction product of a disubstituted dithiocarbamate with sulphur monochloride.

26. A vulcanized rubber derived from rubber or similar material combined with a vulcanizing agent and diphenylethyl thiuram tetrasulphide.

27. The method of vulcanizing rubber which comprises subjecting the rubber to vulcanization with addition thereto of an organic polysulfide of the general formula $(RR'N.CS)_2S_x$, where R and R' represent hydrocarbon radicals and $x$ a number greater than 2.

28. The method of vulcanizing rubber which comprises subjecting the rubber to vulcanization with the addition thereto of an organic polysulfide of the general formula $(R_2N.CS)_2S_4$, where R represents alkyl.

29. The method of vulcanizing rubber which comprises subjecting the rubber to vulcanization with the addition thereto of an organic polysulfide of the general formula $(Et_2N.CS)_2S_4$.

30. The method of vulcanizing rubber which comprises subjecting the rubber to vulcanization with the addition thereto of an organic polysulfide of the general formula $(Me_2N.CS)_2S_4$.

31. The method of vulcanizing rubber without the addition of sulfur, which comprises subjecting the rubber to vulcanization with an organic polysulfide of the general formula $(RR'N.CS)_2S_x$, (where $x$ is a number greater than 2 and R and R' represent hydrocarbon radicals) as the vulcanizing agent.

32. The method of vulcanizing rubber without the addition of sulfur which comprises subjecting the rubber to vulcanization with tetramethylthiurampolysulfide as the vulcanizing agent.

33. The method of vulcanizing rubber which comprises subjecting the rubber to vulcanization with the addition of sulfur, and an organic polysulfide of the general formula $(RR'N.CS)_2S_x$, (where $x$ is a number greater than 2 and R and R' represent hydrocarbon radicals) as an accelerator.

34. The method of vulcanizing rubber which comprises subjecting the rubber to vulcanization with the addition of sulfur, with tetramethylthiurampolysulfide as the accelerator.

35. The method of vulcanizing rubber which comprises subjecting the rubber to vulcanization wth the addition of sulfur, with tetraethylthiurampolysulfide as the accelerator.

Signed at Perth Amboy in the county of Middlesex and State of New Jersey this 16th day of January A. D. 1926.

GEORGE STAFFORD WHITBY.